Figure 11:
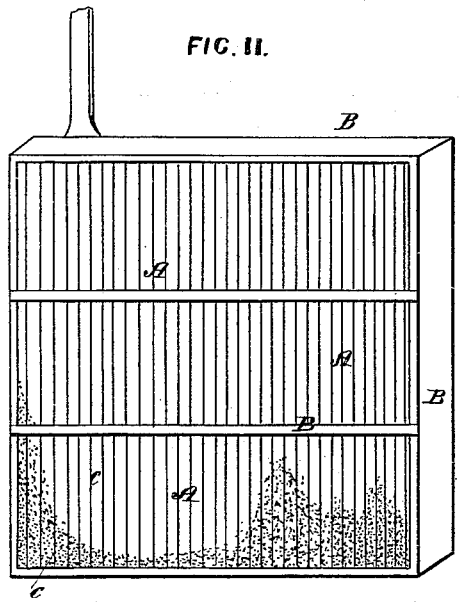

(No Model.)
J. S. SELLON.
SECONDARY BATTERY.
No. 259,657. Patented June 13, 1882.
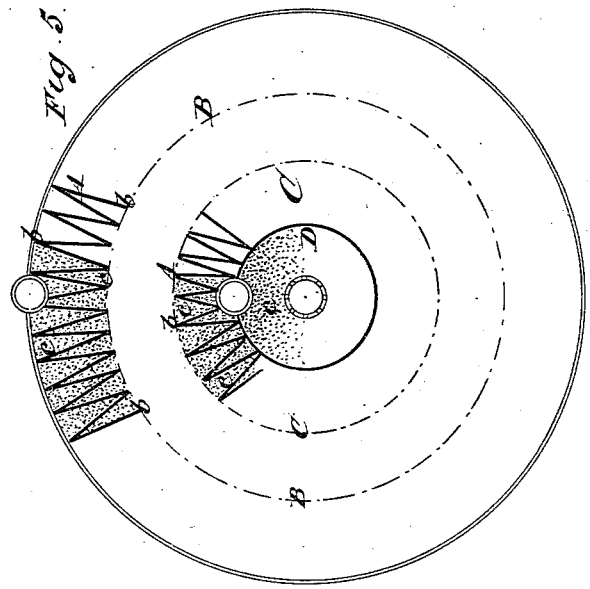
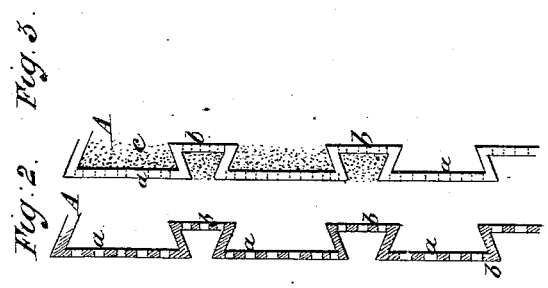
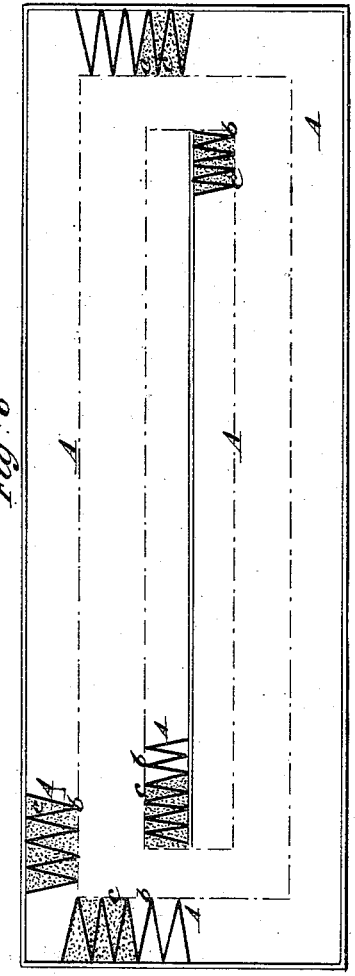
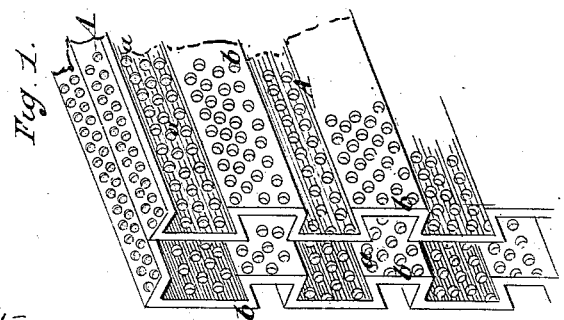
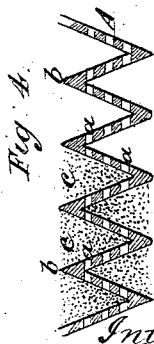
Witnesses
Philip Mauro
C. J. Hedrick
Inventor.
John S. Sellon
by A. Pollok
his attorney (No Model.)  J. S. SELLON.  3 Sheets—Sheet 2.
SECONDARY BATTERY.
No. 259,657.  Patented June 13, 1882.
FIG. 7.
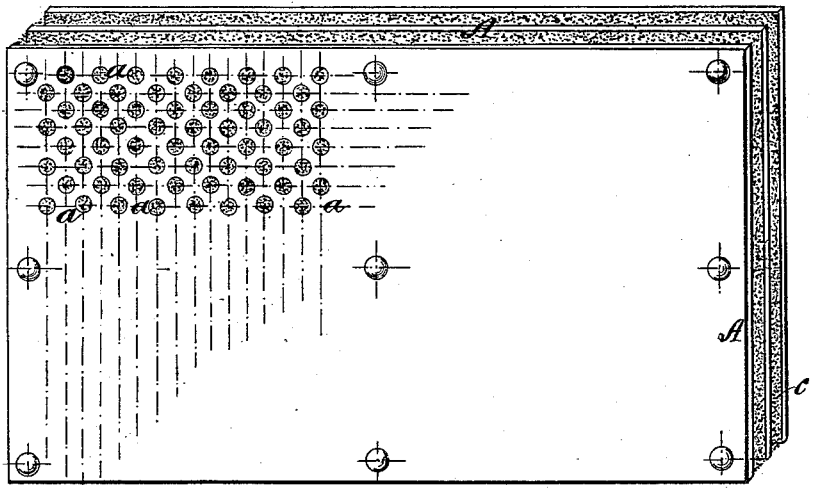
FIG. 8.  FIG. 8ª.
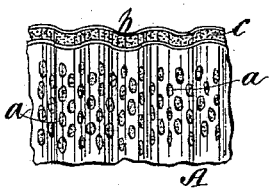  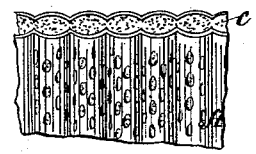
FIG. 10ª  FIG. 9.  FIG. 10.
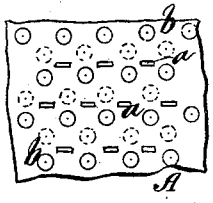  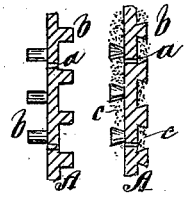
Witnesses
Philip Mauro
C. J. Hedrick
Inventor.
John S. Sellon
by A. Pollok
his attorney (No Model.) 3 Sheets—Sheet 3.

J. S. SELLON.
SECONDARY BATTERY.

No. 259,657. Patented June 13, 1882.

Witnesses
Philip Mauro
C. J. Hedrick

Inventor
John S. Sellon
by A. Pollok
his attorney

N. PETERS. Photo-Lithographer, Washington, D. C.

UNITED STATES PATENT OFFICE.

JOHN S. SELLON, OF HATTON GARDEN, COUNTY OF MIDDLESEX, ENGLAND.

SECONDARY BATTERY.

SPECIFICATION forming part of Letters Patent No. 259,657, dated June 13, 1882.

Application filed April 3, 1882. (No model.) Patented in England September 10, 1881, No. 3,926.

*To all whom it may concern:*

Be it known that I, JOHN SCUDAMORE SELLON, a subject of the Queen of Great Britain, and residing at Hatton Garden, in the county of Middlesex, England, have invented certain Improvements in Secondary Batteries, (for which I have obtained a patent in Great Britain, No. 3,926, dated 10th September, 1881,) of which the following is a specification.

My said invention relates to improvements in secondary batteries or magazines of electricity composed of plates of lead or of other suitable material, which are coated with or have attached to or packed therein or thereon spongy precipitated or reduced lead or other spongy reduced or precipitated metal or metallic matter, such plates being immersed in cells, vessels, or receptacles containing acidulated water or other suitable liquid, my invention having for its object the providing the maximum of active surface in the minimum space, so as to obtain a battery of great strength, and contained in or occupying a small compass comparatively with its efficiency.

In carrying out my invention in order to effect this object I form the battery-plates or electrodes with recesses or receptacles, in which the active material, or material to be made active—such as metal, metallic salts, oxides, or compounds—is packed, and with perforations or holes in the walls thereof. The recesses or receptacles are formed in the body of the plates by indenting or serrating their surfaces, or by constructing the plates with corrugations, grooves, or other suitable section presenting an extended surface, or they are formed between plates, which may be plain or grooved, corrugated, serrated, or indented.

The active material may, if necessary, be retained in the desired position by sheets of felt or other material.

The term "packed," as applied to the filling of the recesses or receptacles with active material, is used herein to indicate generally the application or introduction of the said material mechanically or primarily—that is, in the preparation of the plate prior to charging with electricity—and is not limited to a forcible packing or compression of the active material; or I may apply a coating of metals, metallic salts, oxides, or compounds to the ridges as well as on the surfaces or in the grooves, corrugations, or indentations or cavities, and, if necessary, secure the retention of either one or more of the before-mentioned metals, metallic oxides, or compounds by means of a sheet of felt or other porous material, as before mentioned; or other arrangements may be adopted for that purpose. Pairs of elements or electrodes thus arranged are then placed in communication with a source of electricity and charged in the usual manner.

And in order that my said invention may be fully understood, I shall now proceed more particularly to describe the same, and for that purpose shall refer to the several figures on the annexed sheet of drawings, the same letters of reference indicating corresponding parts in all the figures.

Figure 12:
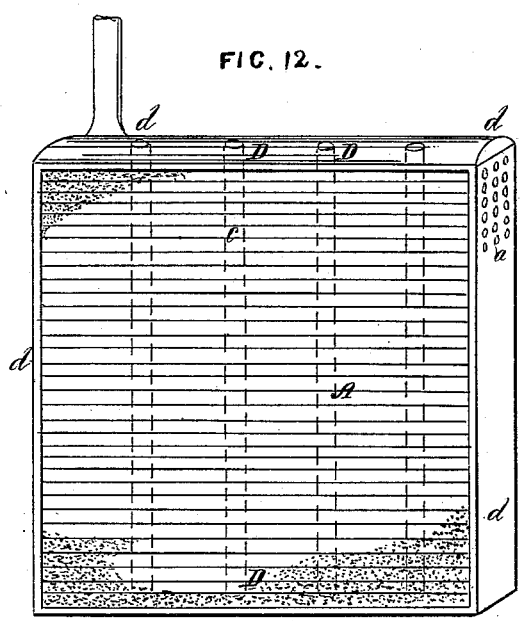
Figure 13:
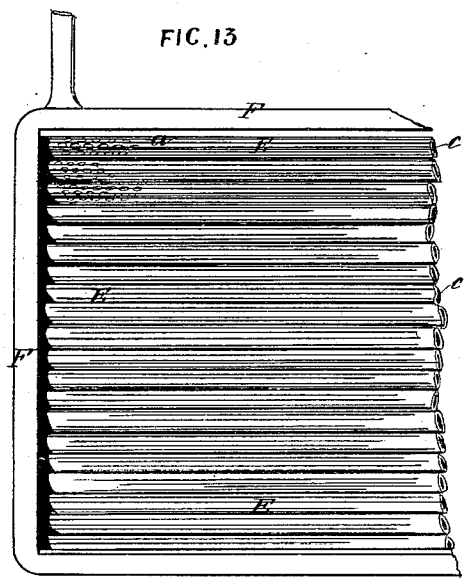

Figure 1 of the accompanying drawings represents a perspective view of a perforated battery-plate formed of dovetail section in accordance with one part of my said invention, such form being especially favorable for the retention of the spongy or other material to be packed therein; and Figs. 2 and 3 show respectively a transverse section and end view of the same without the attachment hereinafter to be described. Fig. 4 shows the section of a portion of a perforated plate formed with angular projections or grooves, which may also be rounded, squared, or of any suitable form; and Figs. 5 and 6 illustrate its application to a circular and rectangular battery, respectively. Fig. 7 represents a front perspective view of a compound battery-plate formed of two or more perforated plates having flat surfaces, while Fig. 8 shows an irregular section of plate, which may be, as well any varied section that may be suitable—as, for example, at Fig. 8ª—employed in lieu of those with flat surfaces. Figs. 9, 10, and 10ª show one form of indented plate—*i. e.*, a plate cast with projections and made with slits or perforations. 9 shows a section of such a plate when first cast, 10 when the projections have been somewhat flattened at the points to give a retended form, and 10ª a front view. Figs. 11, 12, and 13 illustrate additional forms.

It should be understood that all these forms of plates have either left on them in process of manufacture, or have subsequently attached to them at and along their ends, sides, or tops, and bottoms, partially or entirely, or in whatsoever other position may be desirable, by fixing, soldering, casting, or otherwise, solid strips or pieces of metal, to act as conductors for the electric current, or in some cases to give to them desirable strength or rigidity.

A are perforated sheets or plates of lead, platinum, or other suitable material, cast or otherwise conveniently formed, and I so arrange or fix them that a large quantity of spongy or finely-divided lead or of salts or oxides of lead or other suitable compounds, $c$, may be retained or held in, on, or against them in such a manner as to be readily acted upon by the electric current.

The plates may be formed of perforated lead, or of lead cast with holes $a$, either plain or with flutes, corrugations, indentations, shelves, or projections $b$, in or onto which the material $c$, already prepared or to be rendered active, can be packed or placed. The plates of lead may also be roughened on one or both sides by means of suitable tools, whether by pressure or striking, or by any chemical or metallurgical process giving an equivalent result, in such a manner that to a suitable depth on each side of the plate a spongy layer or projecting points or surfaces are produced, which are suitable for retaining the material hereafter to be made active. The plates so prepared may be either simply packed in their roughened surfaces, perforations, or interstices $a$ with the necessary material $c$, or, if it is desired to cover their surfaces, they may be wrapped with or have in any way attached to them any suitable material—such as parchmented paper, felt, flannel, or analogous material—to sustain in place aforesaid the matter already prepared or hereafter to be made active.

On the accompanying drawings some different forms of plates are shown, some of which, in addition to being available in series for acting as accumulators or regulators in electric lighting, or as batteries for the production of motive power, may form convenient single-reservoir batteries for surgical or experimental purposes, as for working small lights or motors, or for other like purposes.

One of the forms of perforated plates which I find very suitable is with corrugations of a dovetail section, as shown at Figs. 1, 2, and 3 of the drawings. Another form (shown at Fig. 4) consists of a perforated plate of uniform angular, serrated, or other suitable section, which may be formed into cells of convenient configuration, as will be understood by reference to the sectional figures shown at 5 and 6 of the drawings, or which may be used as single plates or pairs of plates in series alternately acting as positive and negative.

In Fig. 5 a round outer circular plate, B, is provided, closed in at bottom, if desired, forming a negative cell with numerous perforated divisions or lamina of the form last referred to, having indented or plain surfaces, or otherwise conveniently shaped for holding, when packed, spongy lead, or lead in a fine state of division, or salts or oxides of lead, or suitable compounds.

C is an inner circular positive element or plate of similar construction, formed of a central rod or of a hollow tube, D, having divisions or lamina $b$ therein, as in the negative one, and packed in a similar manner. The central space in the said tube may also be packed or be partially packed with active material, so as to increase the storage capabilities of the battery.

It is obvious that the formation of such perforated or other plates, which may be of any convenient form or kind, may be varied considerably. Thus, for instance, the lamina or divisions may be placed round or against the support as a series of shelves of any suitable inclination, shape, or form, or may be formed of zigzag, V, dovetail, or other convenient section out of perforated sheets of roughened, indented, or plain metal, or any combination of these forms. These lamina, divisions, or projections may be attached or affixed to or sustained in place by the main supporting-plates, the positive plate so prepared standing, when necessary, in or on a small base of suitable shape and material, so as to insulate it, if necessary, from the leaden bottom of the negative plate. This would, however, be unnecessary if the negative element be not constructed with a metallic or conductive bottom.

Plates constructed, formed, and prepared as above described may obviously be arranged into cells of various configurations, as, for example, oval, square, or rectangular, the last form being represented at Fig. 6 of the drawings—the object being to attain a large amount of surface of the material (either already prepared or hereafter to be rendered active) in such a position and under such conditions as to be readily subjected to the influences of charging or discharging, as required. Plates so constructed or arranged may, under some circumstances, form convenient cells without any outer casing, jars, cases, or boxes of earthenware, glass, wood, gutta-percha, ebonite, papier-maché, or other convenient insulating material being used, to contain one, two, or any convenient number of them.

A compound form of plate is represented in Fig. 7 of the drawings, composed of perforated sheets of lead or other suitable substances, as before specified, so riveted, soldered, or connected together, or may be also closed at the ends, sides, or top and bottom, as to leave suitable intervening spaces, openings, or receptacles, into which the aforesaid spongy or finely-divided lead, salts, or equivalent compounds is or are packed. These compound plates may be obviously formed of sheets of fluted, corrugated, or similar irregular section, as shown, for example, at Fig. 8 of the accompanying drawings.

In carrying out what is called the "formation," or rendering available of some of these packed plates with the electrical current for the purposes required, I have found it in some cases convenient for the first few hours, until the active material has somewhat hardened, to use pieces of parchmented paper, felt, flannel, woven fabric, wood-work, or any suitable substance or material to sustain the material in or on the plates, and then to remove it to lessen the resistance. Several of the above-referred-to forms of plates can then be maintained without any wrapping or separating medium, and I thus obtain more favorable results.

It will be understood that a great variety of forms and combinations can be adopted without departing from the principle of my invention.

In Fig. 11 is shown a battery-plate or electrode formed of a frame, B, with a series of wires to retain the active material therein. In Fig. 12 the side wall of the frame is perforated, the wires run vertically instead of horizontally, and a series of upright tubes are placed in the interior. In Fig. 13 a series of perforated tubes, E, are secured in a frame, F, and are filled with the active material.

In all the figures it will be seen that the several plates or electrodes have recesses or receptacles for receiving the active material or material to be rendered active, the recesses or receptacles being formed by the folds or corrugations in the plate, as in Figs. 1, 2, 3, 4, 5, and 6, between projections on the faces of the plates, as in Figs. 9, 10, and 10$^a$, between the plates, as in Fig. 7, between the plates and in corrugations formed in the plate, as in Figs. 8 and 8$^a$, between the walls of the cages, Figs. 11 and 12, or in the hollow of the tubes, Fig. 13.

In constructing batteries when great lightness and portability are required, as well as increased durability, I employ plates, especially positive plates, formed of the thinnest possible platinum-foil, stretched in frames of wood or other suitable substance, and perforated, indented, corrugated, fluted, or any combination of such forms or others of a suitable kind against, in, or on which the active material can be placed.

Having now described and particularly ascertained the nature of my said invention and the manner in which the same is or may be used or carried into effect, I would observe, in conclusion, that I wish it to be understood that I do not claim the use of either spongy or finely-divided lead, nor of any oxide salt or preparation of lead, *per se*, nor the use of corrugated or grooved sheets or plates of lead unperforated for the retention of such substances; but

I claim—

1. An electrode for secondary batteries or accumulators having one or more receptacles wherein the active material or material to become active is packed, and provided with holes or perforations in the walls of said receptacles, substantially as described.

2. In a secondary battery or accumulator, a perforated battery-plate having formed therein recesses or receptacles, and having the active material or material to become active packed in said recesses or receptacles, substantially as described.

In testimony whereof I have signed my name to this specification in the presence of two subscribing witnesses.

JOHN S. SELLON.

Witnesses:
J. HENRY JOHNSON,
JAMES Y. JOHNSON,
47 *Lincoln's Inn Fields, London.*